R. L. FITZGERALD.
DAVENPORT AUTOMOBILE BODY.
APPLICATION FILED SEPT. 23, 1915.
1,193,530.
Patented Aug. 8, 1916.
3 SHEETS—SHEET 1.
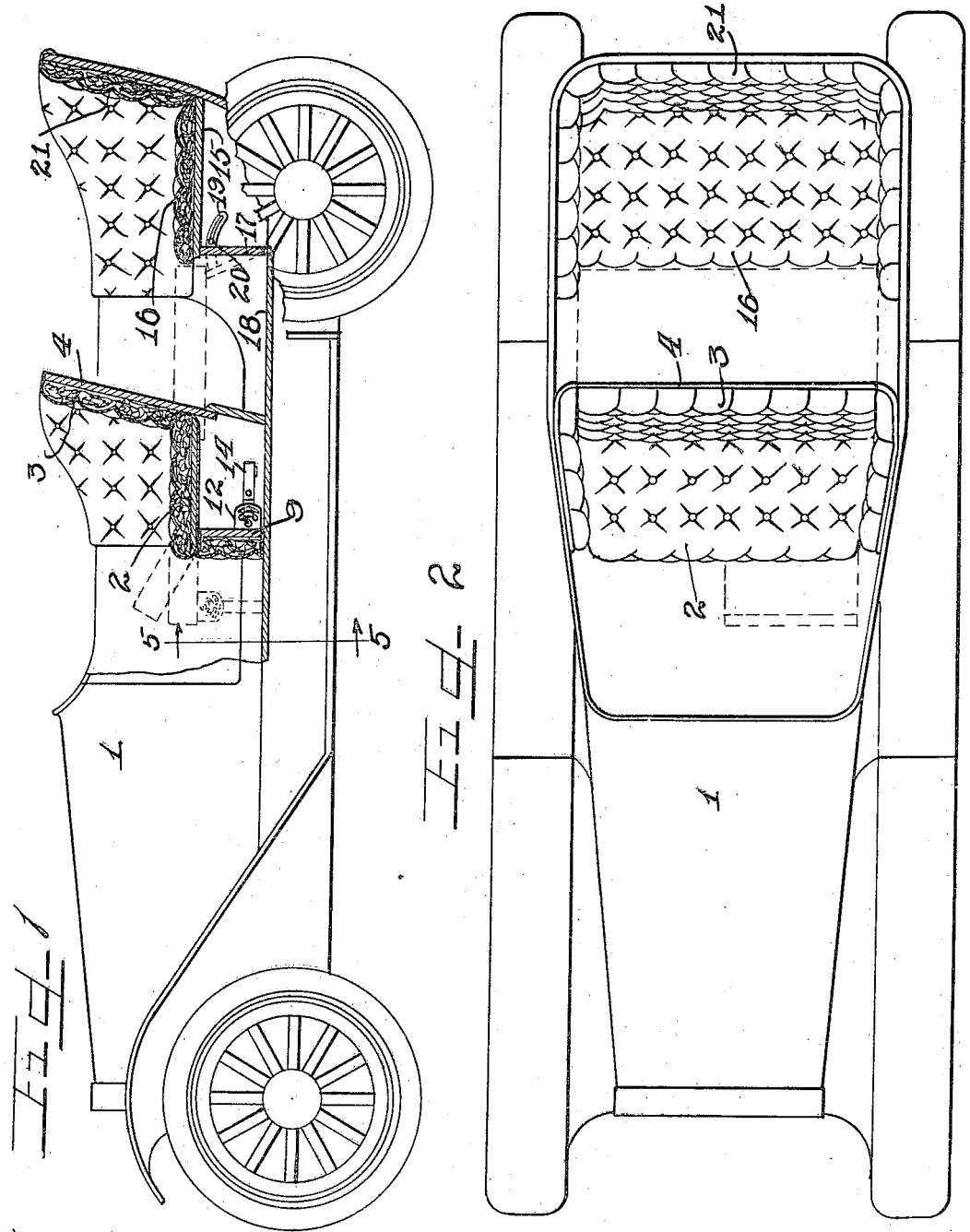

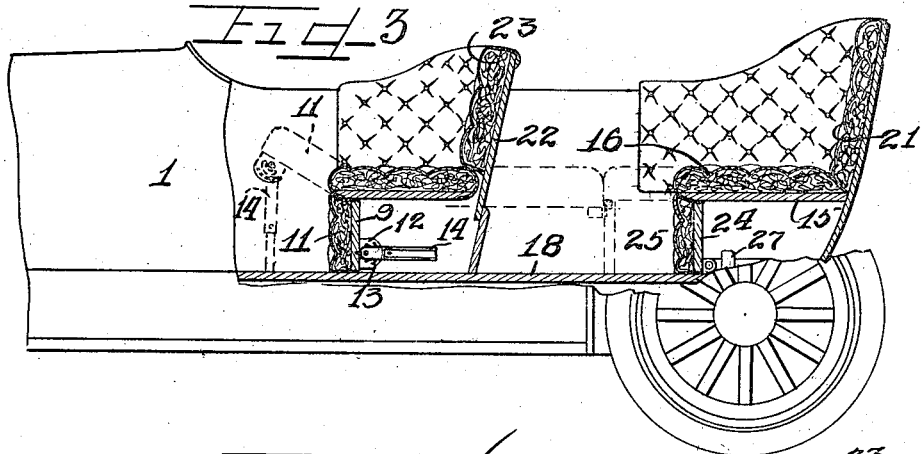
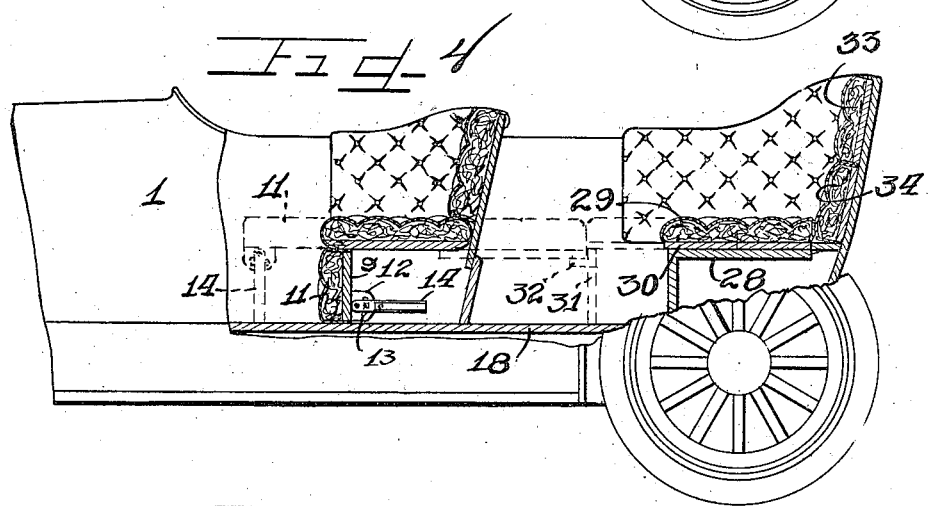
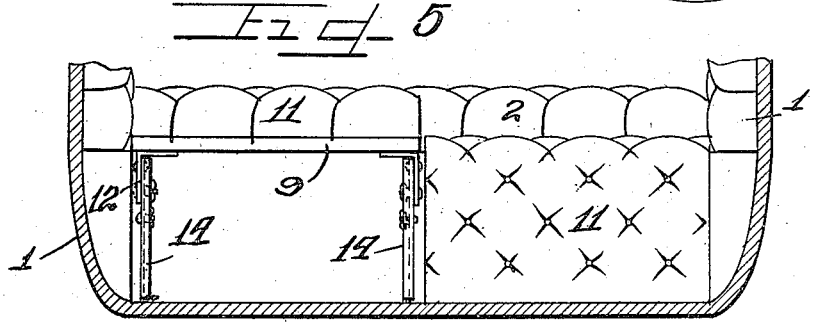

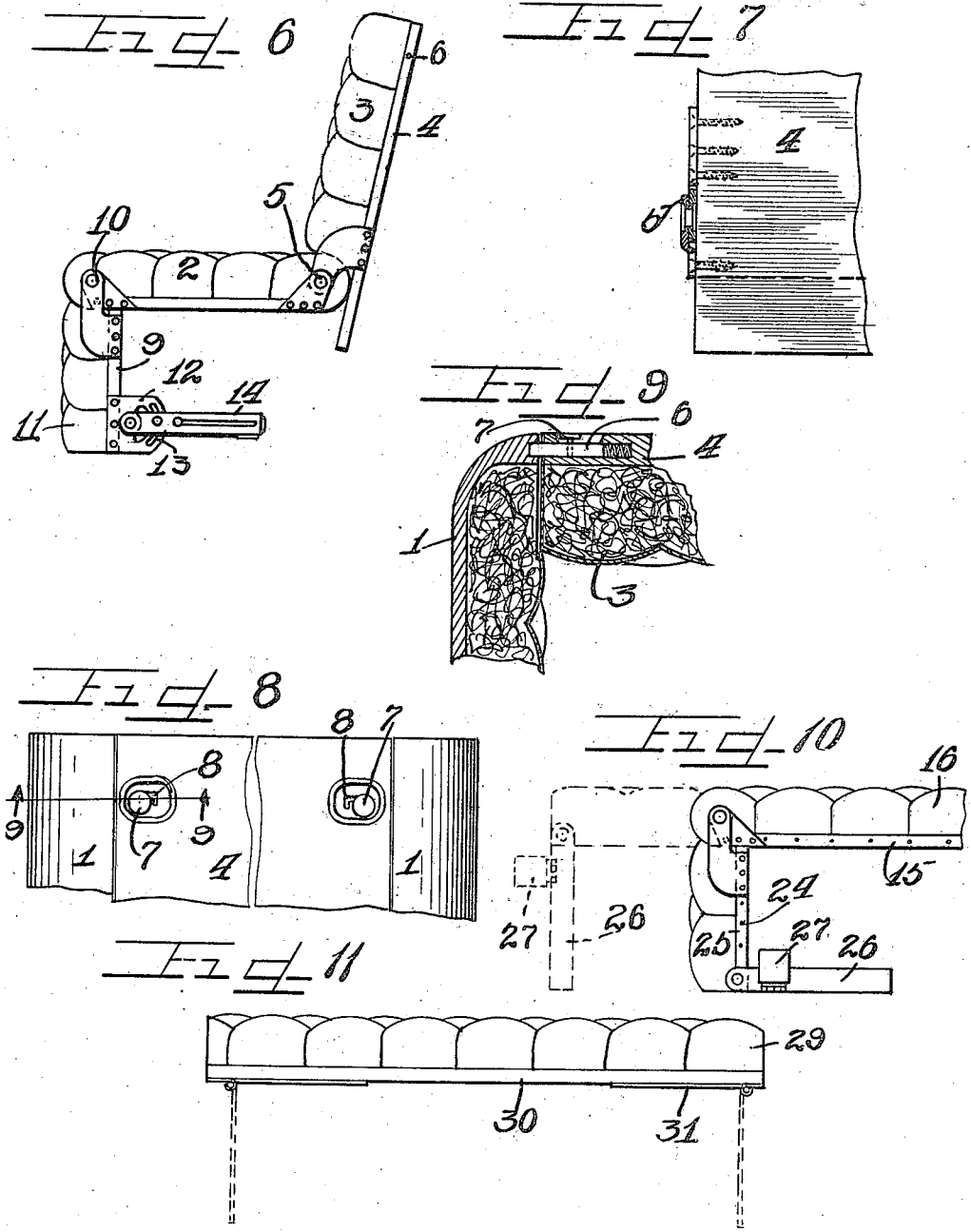

UNITED STATES PATENT OFFICE.

RICHARD L. FITZGERALD, OF JOLIET, ILLINOIS.

DAVENPORT AUTOMOBILE-BODY.

1,193,530.  Specification of Letters Patent.  Patented Aug. 8, 1916.

Application filed September 23, 1915. Serial No. 52,204.

*To all whom it may concern:*

Be it known that I, RICHARD L. FITZGERALD, a citizen of the United States, and a resident of the city of Joliet, in the county of Will and State of Illinois, have invented certain new and useful Improvements in Davenport Automobile-Bodies; and I do hereby declare that the following is a full, clear, and exact description of the same, reference being had to the accompanying drawings, and to the numerals of reference marked thereon, which form a part of this specification.

This invention relates to an improvement in the construction of automobile bodies whereby the seats may be adjusted from their usual position to afford a bed or couch within the automobile. Structures have been designed permitting a bed or couch to be made up within the body of an automobile, but in such instances where the same have been readily convertible again into a touring car body, auxiliary mechanisms and parts have been necessary. This invention, however, relates to a body structure wherein the usual seats provided in the touring car body are readily convertible by co-action with one another to form a bed or couch within the body of the motor car and in a manner to permit operation of the motor car on the road with the seats so adjusted, if desired.

It is an object therefore of this invention to provide an automobile body wherein the front and rear seats are adjustable for co-action with one another to afford a bed.

It is also an object of this invention to provide an automobile body structure wherein the back of the front seat of a touring car body is adjustable rearwardly into horizontal position for co-action with the rear seat of the automobile to provide a bed within the body of the car.

It is also an object of this invention to construct an automobile body wherein the kick boards of both the front and back seats are adjustable into a horizontal plane together with the back of the front seat to afford a couch or bed within the automobile body.

It is furthermore an important object of this invention to provide an automobile body structure of the usual touring car type wherein the various parts of the respective seat members are adjustable to afford a couch or bed within the automobile body, and so designed as to permit the automobile to be driven even when the seats are adjusted for use as a bed.

It is finally an object of this invention to construct an improved type of automobile body permitting the same to be readily converted into bed form without requiring auxiliary attachments and in a short space of time.

The invention (in a preferred form) is illustrated in the drawings and hereinafter more fully described.

In the drawings: Figure 1 is a side elevation of an automobile with the body broken away and parts shown in section to illustrate the construction of the seats. Fig. 2 is a top plan view thereof. Fig. 3 is a fragmentary view similar to Fig. 1, illustrating another form of construction. Fig. 4 is a view similar to Fig. 3, illustrating still another slightly modified form of construction. Fig. 5 is a fragmentary detail section taken on line 5—5 of Fig. 1, with parts shown in an adjusted position. Fig. 6 is a fragmentary detail illustrating the hinge connection of the parts of the front seat of the type of body shown in Fig. 1. Fig. 7 is a detail rear view of the back of the front seat with parts in section. Fig. 8 is a fragmentary back view of the front seat shown in Fig. 1. Fig. 9 is a detail section taken on line 9—9 of Fig. 8. Fig. 10 is a detail illustrating the construction of the back seat shown in Fig. 3. Fig. 11 is a front view of the kick board of the back seat shown in the construction of Fig. 4.

As shown in the drawings: the reference numeral 1, indicates as a whole the body of a motor car of the touring body type, and disposed in the front compartment thereof is a front seat comprising a normally fixed substantially horizontal upholstered cushion 2, and an upholstered cushion 3, forming the back therefor mounted upon a back board 4, which is hinged to the support for said cushion 2, by a hinge connection 5, shown in detail in Fig. 6. Recessed into said back board 4, on each side thereof, are spring impelled latch bolts 6, which, as clearly shown in Figs. 8 and 9, are adapted to engage into an aperture provided in the side walls of the body 1, of the car, and each bolt 6, is provided with an actuating head 7, the stem of which is constructed to lodge in either of the downturned ends of a slot 8, provided therefor in the back board 2, to retain the latch bolts either in locking or in retracted position, as desired.

Mounted adjustably in front of and beneath the front seat 2, in the position of the usual kick board, is a board 9, consisting of two parts, as shown in Fig. 5, each connected by a hinge 10, to the supporting board of the seat 2, and provided with a strip of upholstery 11, adapted to be swung into the dotted line position shown in Fig. 1, either in the plane of the seat 2, or tilted slightly thereabove to form a head-rest if desired. Mounted upon said kick boards 9, are plates 12, each provided with a curved guide slot 13, and hinged on each plate 12, is an extensible leg 14, provided with a pin for engagement with said guide slot 13, whereby the angle of said kick board 9, and its upholstered strip 11, may be changed by changing the length of said extensible legs 14.

Mounted in the rear compartment of the motor car body 1, is a back seat board 15, with an upholstered cushion 16, on the upper surface thereof, and mounted beneath the forward end of said seat board 15, is a kick board 17, hinged at its lower end to the floor 18, of the car body, and having a curved slotted bracket plate 19, secured to the upper end thereof engaging a pin 20, secured in the side walls of the body to limit the outward swinging movement of said kick board into the dotted line position shown in Fig. 1. The purpose of said hingedly mounted kick board 17, is to support the end of the back board 4, when the same is swung downwardly into the dotted line position shown in Fig. 1. The rear end of the motor car is provided as usual with upholstery 21, affording a back for the rear seat, but in the present instance the same is not adjustable and forms no part of the bed or couch adapted to be formed within the motor car.

In Fig. 3, I have shown a slightly modified form of construction wherein the back of the front seat is slightly lower, conforming more to the latest type of body design, and consists of a back board 22, provided with a strip of upholstery 23, the back board being connected by means of a hinge connection such as shown in Fig. 6, to the seat member 2. Of course, due to its less height, the same when swung rearwardly, is not sufficiently long to register with the rear seat 16, and consequently a hinged kick board 24, is provided connected to the board 15, of the rear seat and provided with a strip of upholstery 25. Said kick board 24, is provided with a pivoted leg 26, having a hinged bracket piece 27, thereon, the detail of construction of which is shown in Fig. 10, adapted to receive the end of the board 22, of the back of the front seat resting thereon when the same is swung downwardly into a horizontal position such as shown in dotted lines in Fig. 3.

In the modified form of device illustrated in Fig. 4, in place of providing an upholstered kick board for the back seat, I have shown a fixed supporting board 28, for a slidable rear seat cushion 29, which is secured to a reinforcing and supporting board 30, sliding upon said fixed board 28. Hingedly mounted legs 31, are provided on said movable reinforcing supporting board 30, as shown in Fig. 11, adapted to swing downwardly and rest upon the floor 18, of the motor car, and provided with offset extensions 32, to receive the back board 22, of the front seat resting thereon in the dotted line position shown in Fig. 4. The back of the rear seat 29, consists of two sections, an upper upholstered section 33, and a lower upholstered section 34, the latter adapted to slide downwardly upon the fixed seat board 28, when the seat 29, is moved forwardly in the car.

The operation is as follows: In the form of device illustrated in Figs. 1 and 2, in order to form a bed within the motor car the back of the front seat is swung downwardly into the dotted line position shown in Fig. 1, to rest upon the forwardly swung kick board 17, of the rear seat, and the front kick boards 9, are each swung upwardly, if so desired, or only one, as the case may be, and supported upon the extensible legs 14, provided for the purpose, and may be tilted as shown in the dotted line position in Fig. 1 to afford a head-rest for the bed or couch so formed within the motor car body. In the form of device illustrated in Fig. 3, the operation of the kick board and back of the front seat is exactly the same, with the exception that the back of the front seat is of slightly less height, and as a consequence the kick board of the rear seat is upholstered and adapted to be swung upwardly into an alined horizontal position between the rear seat and the back of the front seat when the same is swung upwardly, as shown in dotted lines in Fig. 3.

In Fig. 4 the construction of the front seat is identical with that shown in Fig. 3, but in place of the upholstered kick board of the rear seat, the back of the rear seat is made in upholstered sections and the rear seat and one of the upholstered sections of the back thereof are slidable forwardly in the car and register with the back of the front seat when the same is swung downwardly in the dotted line position shown in Fig. 4.

Due to the fact that the front kick board is constructed of two parts, either one or both of which may be swung upwardly into horizontal position, as shown in Fig. 5, the kick board for the driver's seat may be left in the normal vertical position, so that the car may be operated, as for instance in use as an ambulance, permitting a person to lie at full length beside the driver.

I am aware that various details of construction may be varied through a wide range without departing from the principles of this invention, and I therefore do not purpose limiting the patent granted otherwise than necessitated by the prior art.

I claim as my invention:

In a motor car body of the class described, the combination with the front and rear seats thereof, of a hingedly mounted back for the front seat adapted to be swung into horizontal position to span the space between said front and rear seats, a hingedly mounted kick board for the front seat adapted to be swung upwardly into horizontal position, and a hingedly mounted rear kick board adapted to be shifted at its upper end into position to support the rear end of the front seat back when the latter is adjusted to its horizontal position.

In testimony whereof I have hereunto subscribed my name in the presence of two subscribing witnesses.

RICHARD L. FITZGERALD.

Witnesses:
 CHARLES W. HILLS, Jr.,
 EARL M. HARDINE.

Copies of this patent may be obtained for five cents each, by addressing the "Commissioner of Patents, Washington, D. C."